US007821995B2

(12) United States Patent
Das et al.

(10) Patent No.: US 7,821,995 B2
(45) Date of Patent: Oct. 26, 2010

(54) ACTIVE SESSION MOBILITY SOLUTION FOR RADIO LINK PROTOCOL

(75) Inventors: Suman Das, Scotch Plains, NJ (US); Sarit Mukherjee, Morganville, NJ (US); Sureshbabu Nair, Whippany, NJ (US); Priya Rajan, Somerset, NJ (US); Ajay Rajkumar, Morristown, NJ (US); Sampath Rangarajan, Bridgewater, NJ (US); Michael D Turner, Madison, NJ (US); Harish Viswanathan, Basking Ridge, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 695 days.

(21) Appl. No.: 10/955,242

(22) Filed: Sep. 30, 2004

(65) Prior Publication Data

US 2006/0067273 A1    Mar. 30, 2006

(51) Int. Cl.
    H04W 4/00    (2009.01)
(52) U.S. Cl. ...................................... 370/331; 455/436
(58) Field of Classification Search ......... 455/436–444; 370/331
    See application file for complete search history.

(56) References Cited

U.S. PATENT DOCUMENTS

| 6,507,572 B1 * | 1/2003 | Kumar et al. ............... 370/335 |
| 6,529,527 B1 * | 3/2003 | Chen et al. .................. 370/503 |
| 6,590,879 B1 * | 7/2003 | Huang et al. ................ 370/331 |
| 2003/0054812 A1 * | 3/2003 | Hunzinger .................. 455/423 |
| 2003/0123401 A1 * | 7/2003 | Dean .......................... 370/318 |

FOREIGN PATENT DOCUMENTS

| EP | 05 25 5861 | 1/2006 |
| WO | WO 01/61934 A | 8/2001 |
| WO | WO 02/47317 A | 6/2002 |

OTHER PUBLICATIONS

Krishnamurthi et al., Mar. 1, 2001, IETF, "Buffer Management for Smooth Handovers in IPv6".*
Ramjee R et al: "Hawaii: a domain-based approach for supporting mobility in wide-area wireless networks" IEEE. Oct. 31, 1999, pp. 283-292. XP010356967 IEEE.
Campbell J Gomez C-Y Wan S Kim Columbia University Z Turanyi A Valko Ericsson A: "Cellular IP" IETF Standard-Working-Draft, Internet Engineering Task Force, IETF, CH, vol. mobileip, Jan. 2000 XP015023315 ISSN: 0000-0004.

* cited by examiner

Primary Examiner—Lester Kincaid
Assistant Examiner—Steven Lim
(74) Attorney, Agent, or Firm—Wall & Tong, LLP

(57) ABSTRACT

An active session mobility solution for radio link protocol (RLP) in accordance with the present invention defines two RLP migrations states. A first state is defined as a forward-link RLP state and depicts the communication of data from a home agent to an access terminal in an IP network. A second state is defined as a reverse-link RLP state and depicts the communication of data from the access terminal to the home agent in the IP network. In one embodiment of the seamless active session mobility solution for RLP in accordance with the present invention, a two-stage RLP transfer process for the migration of the two defined states from a source to a target is implemented. In a first stage, the forward-link RLP state is transferred from a source to a target. In a second stage, frame selection and the reverse-link RLP are transferred from the source to the target.

23 Claims, 8 Drawing Sheets

ACTIVE SESSION MOBILITY SOLUTION FOR RADIO LINK PROTOCOL

FIELD OF THE INVENTION

The present invention relates to mobile communications systems and, more specifically, to mobility management techniques in such systems that support multimedia applications in a highly dynamic Internet Protocol-based networking environment.

BACKGROUND OF THE INVENTION

Considerable attention has been directed toward the implementation of mobile telecommunication service in computer data networks, and particularly the ability to route communication content to mobile wireless nodes that routinely connect to the data network at different points of attachment, via air interfaces. These include cellular telephones, Personal Digital Assistants (PDAs), laptop computers, and other mobile wireless communication equipment.

To facilitate mobile wireless telecommunication service in a data network, it is desirable (although not always possible) to allow mobile wireless nodes to change their link-layer point of network attachment without reassigning a new network address. According to current data network telecommunication standards for mobile equipment in general (e.g., the "Mobile IP" standards promulgated by the Internet Engineering Task Force (IETF) or the General Packet Radio Service (GPRS) standards proposed by the European Telecommunication Standards Institute (ETSI)), one way to provide the desired network address transparency is to employ "mobility agents." These are network routing nodes that route communication content on behalf of mobile nodes as they move around the network. For example, according to the IETF Mobile IP standards, a mobile node's mobility agents may consist of a "home agent" routing node and may also include a "foreign agent" routing node. The home agent is a routing node in the mobile node's subnetwork that maintains a network interface on the link indicated by the mobile node's "home address," which is a network address intended to remain assigned to the mobile node for an extended time period. When the mobile node is away from its home subnetwork, the home agent intercepts communication content bound for the mobile node's home address and tunnels it for delivery to a "care-of" address assigned to the mobile node when the mobile node registers on a foreign subnetwork. The care-of address may be the address of a foreign agent routing node in the foreign subnetwork.

Correspondent nodes wishing to communicate with a foreign-registered mobile node are able to address their communication content to the mobile node's home address. Transparently, the communication content is tunneled to the mobile node's care-of address and delivered to the mobile node on the foreign subnetwork. Normal routing may be used for sending return communication content from the mobile node to the correspondent node.

Some link-level protocols used to support mobile node communications include a Point-to-Point Protocol and a Radio Link Protocol. Protocols typically utilized in non-mobile applications, such as the Internet Protocol (IP) and the Point-to-Point protocol (PPP), are layered on top of a lower level mobile protocol, such as the Radio Link Protocol (RLP) defined by the Third Generation Partnership Project 2 (3GPP2). More specifically, when a mobile node connects to a gateway on the Internet, a Point-to-Point Protocol (PPP) session is typically established between the mobile node and the gateway device. As is known in the art, PPP is used to encapsulate network layer datagrams over a serial communications link. For more information on PPP see Internet Engineering Task Force ("IETF") Request for Comments ("RFC"), RFC-1661, RFC-1662 and RFC-1663 incorporated herein by reference in its entirety. The gateway, or tunnel initiator, typically initiates establishment of a tunnel connection to a tunnel endpoint server. For example, when a mobile node is connected to a foreign agent, a connection oriented point-to-point communication link, such as a Layer 2 Tunneling Protocol (L2TP) tunnel, is typically established between the foreign agent and the home agent to permit the transfer of data to and from the mobile node. See Layer Two Tunnelling Protocol (L2TP), Request for Comment (RFC) 2661, A. Valencia, et al., June 1999, herein incorporated by reference in its entirety.

In a wireless environment, reliable end to end transmission is commonly provided by a Radio Link Protocol (RLP) that is highly optimized for the particular wireless transmission media that are in use. Examples of RLP protocols can be found in TIA/EIA IS-707 (for CDMA) and IS-135 (for TDMA). RLP is a reliable link protocol that allows retransmission from a source to a destination of the link of lost control packets or lost new and retransmitted data packets. The scheme allows the sender to retransmit the unacknowledged or negatively acknowledged packets preemptively at the link layer rather than rely on end-to-end retransmissions by higher layer protocols. This scheme can efficiently improve performance since it prevents end-to-end retransmissions and transport layer time-outs. The foregoing routing mechanisms may also be used for mobile wireless nodes connected to a foreign subnetwork via an air interface. However, a problem may arise if the mobile wireless node is being actively transported while communicating over the data network and a call handoff is required from one radio base station to another. In that case, the old base station may be linked to one foreign agent, while the new base station is linked to another foreign agent. Call handoff then requires that the communication tunneling endpoint be transferred from the old care-of address to the new care-of address.

This may create gaps that interrupt the timely delivery of call content, which can degrade communication quality, particularly for voice telephony. Such gaps arise from the inability of the data network to coordinate well with the air interface so as to determine the exact time of handoff. Delay can occur between the point of handoff and the point at which the home agent begins routing communication content to the new care-of address.

Accordingly, there is a need in a data network telecommunication system serving mobile wireless nodes for improved call handoff without loss of communication content. What is required is a system and method that seamlessly routes communication content during handoff so that the mobile wireless node does not experience noticeable communication content loss or delay other than that caused by the air interface, if any.

SUMMARY OF THE INVENTION

The present invention addresses various deficiencies of the prior art by providing a seamless active session migration solution for a reliable protocol such as radio link protocol.

In one embodiment of the present invention, a method for seamless active session migration of a radio link protocol from a source to a target in a wireless IP network includes decoupling the radio link protocol into at least a forward-link state and a reverse-link state and migrating at least the forward-link state from the source to the target in a first stage of migration and migrating at least the reverse-link state from the source to the target in a second stage of migration.

In an alternate embodiment of the present invention, a first stage of migration of the decoupled radio link protocol includes transmitting, to the source and to the target, a signal indicating an imminent migration of the forward-link state of the radio link protocol from the source to the target, tunneling, upon receipt of the signal by the source, forward-link data segmented by the source to the target, the segmented data to be communicated by the target to an access terminal, transmitting from the target to the source an acknowledgment indicating the readiness of the target to receive the migration of the forward-link state of the radio link protocol from the source and tunneling, upon receipt of the acknowledgment by the source, pre-segmented forward-link data from the source to the target to be segmented by the target and communicated by the target to an access terminal.

In an alternate embodiment of the present invention, a second stage of migration of a decoupled radio link protocol includes transmitting, from the source to at least the target, a signal indicating that frame selection is to be performed by the target, transmitting, from the source to the target, a sequence number of a next expected reverse-link octet, forwarding reverse-link octets having sequence numbers less than the sequence number of the next expected reverse-link octet to the source to be segmented by the source and communicated toward a home agent, and forwarding reverse-link octets having sequence numbers greater than or equal to the sequence number of the next expected reverse-link octet to the target to be segmented by the target and communicated toward the home agent.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention advantageously provides a seamless active session mobility solution for reliable protocols such as a Radio Link Protocol (RLP). Although various embodiments of the present invention are described herein with respect to an RLP protocol being used in a flat network architecture based on base station routers (BSRs) described in a commonly assigned patent application entitled "A wireless communications system employing a network active set formed from base stations operable as primary and secondary agents", the specific embodiments of the present invention should not be treated as limiting the scope of the invention. It will be appreciated by those skilled in the art and informed by the teachings of the present invention that the active session mobility solution of the present invention may be advantageously implemented in substantially any network implementing a reliable protocol, such as a conventional CDMA hierarchical network implementing RLP or a UMTS network based on the General Packet Radio Service (GPRS) model implementing a radio link control (RLC) protocol.

Figure 1:
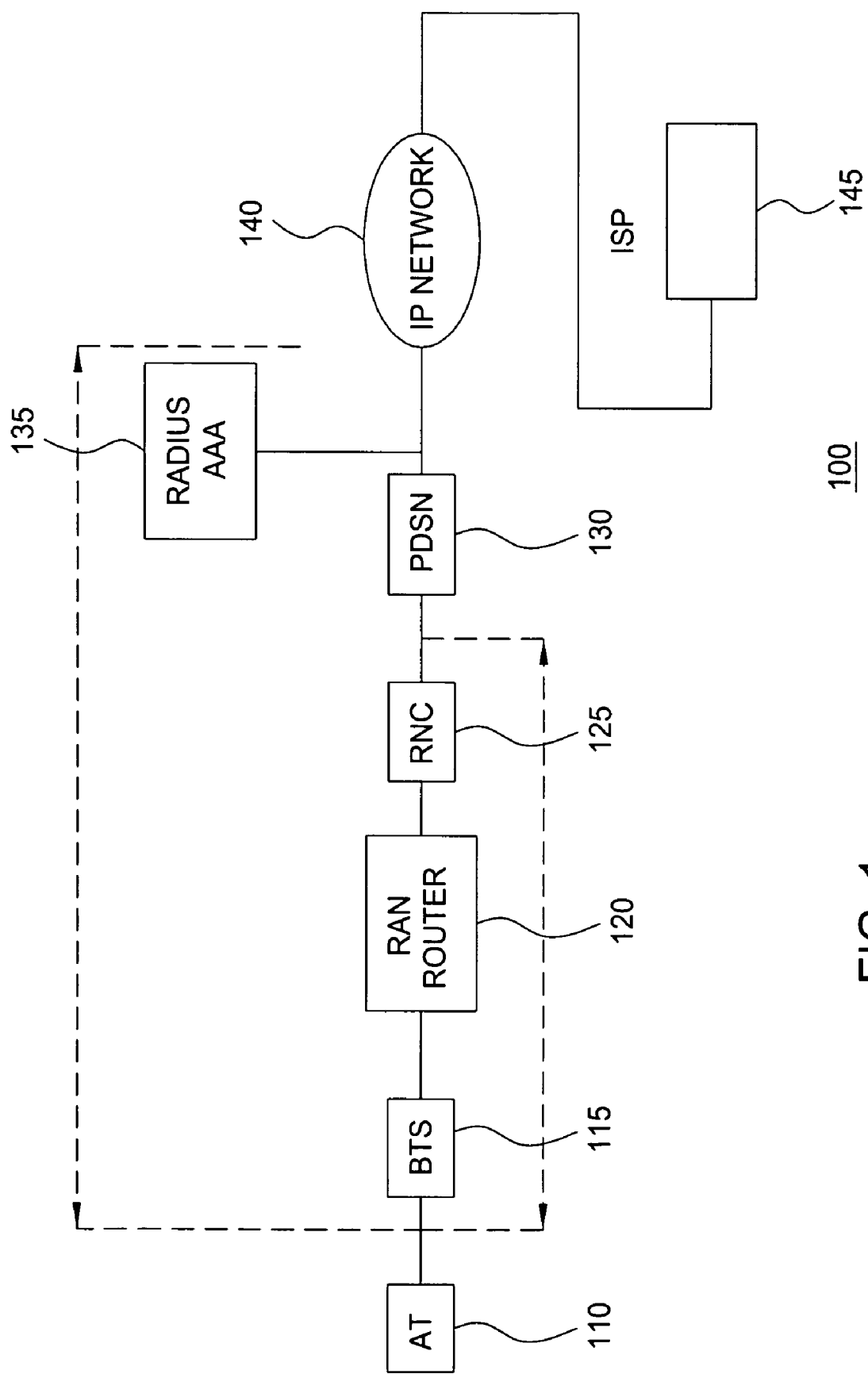
FIG. 1 depicts a high level block diagram of a conventional CDMA hierarchical wireless IP network.

To assist in the description of various mobile IP protocols associated with the implementation of various embodiments of the present invention, the inventors herein depict a conventional hierarchical CDMA wireless IP network. FIG. 1 depicts a high level block diagram of a conventional CDMA hierarchical wireless IP network. The hierarchical CDMA network 100 of FIG. 1 comprises an access terminal (AT) 110, a Base Transceiver Station (BTS) 115, a RAN router 120, a radio network controller (RNC) 125, a PDSN 130, an IP network 140 and an Internet service provider (ISP) 145. Although the CDMA network 100 of FIG. 1 further depicts a RADIUS Authentication, Authorization, and Accounting (AAA) server 135, the AAA server 135 is merely depicted for providing a complete depiction of the CDMA network 100. As the function of the AAA server 135 is ancillary to the concepts of the present invention, the AAA server 135 will not be described herein.

In the hierarchical CDMA network 100 of FIG. 1, the BTS 115 performs the function of interfacing to the AT 110 over the air interface. It contains the hardware and software to perform the digital signal processing required to implement the air interface, and to communicate with back-end servers and routers. The HCS 115 also contains the RF components required to transmit the signals over the air, and to receive the RF signals from the AT 110.

The RAN Router 120 provides a common point in the CDMA network 100 where the back haul interfaces from several BTSs may terminate. This function is required to allow routing of information received from the air interface to a control point for a session, where frame selection can be performed. The RAN router 120 also allows routing of data between the BTSs and the ISP 145 in a global internet.

The RNC 125 provides signaling and traffic processing control for each session. These functions include session establishment and release, frame selection and Radio Link Protocol (RLP) processing. As previously mentioned, RLP is a reliable link protocol between, for example the AT 110 and the RNC 125, that allows retransmission from a source to a destination of the link of lost control packets or lost new and retransmitted data packets. The scheme allows the sender to retransmit the unacknowledged or negatively acknowledged packets preemptively at the link layer rather than rely on end-to-end retransmissions by higher layer protocols. This scheme can efficiently improve performance since it prevents end-to-end retransmissions and transport layer time-outs. The RNC 125 provides the processing for the standard interface to the PDSN 130 and allows the RNC functions to interface to the PDSN 130. The RNC 125 terminates all mobility management functions of the radio network, and is the demarcation point between the Radio Network and the IP Network 140 which ultimately communicates with the ISP 145.

The PDSN 130 terminates the point-to-point protocols (PPP), and/or generates a tunnel to a Layer 2 Tunnel Protocol Network Server (LNS) if L2TP Internet access is being used. The PDSN 130 resides in the serving network, and is allocated by the serving network where the AT 110 initiates a service session. The PDSN 130 terminates a residing PPP link protocol with the AT 110. The PDSN 130 serves as a Foreign Agent (FA) in the network 100. The PDSN 130 maintains link layer information and routes packets to external packet data networks or to a Home Agent (HA) in the case of tunneling to the HA. The PDSN 130 also maintains an interface to the backbone IP network 140.

The PDSN 130 maintains a serving list and unique link layer identifier for all the ATs that have an active session with the PDSN 130. The PDSN 130 uses this unique link layer identifier to reference each AT connected to the PDSN 130, and maintains an association between the IP address of the AT and the HA address and the link identifier. The link layer association is maintained at the PDSN 130 even when the AT 110 is dormant. When the AT 110 moves to a location served by a different RNC 125, the PDSN 130 interacts with a new serving RNC to facilitate a handoff from the RNC with which the AT 110 had an active session.

In contrast to the above hierarchical architecture of the CDMA network 100 of FIG. 1, a flat network architecture is proposed in a commonly assigned patent application entitled "A wireless communications system employing a network active set formed from base stations operable as primary and secondary agents", which incorporates the RNC and PDSN functions together with the Cell Site equipment into one network element that connects directly to the Internet. This concept therefore has the potential to reduce the cost and complexity of deploying a conventional hierarchical network, and of adding new wireless access points (cell sites) to an already deployed network. In such a flat network, deployment cost is reduced compared with the traditional network architecture because the centralized RNC functions and the centralized PDSN functions are incorporated into the cell site equipment. Also, there is a potential to reduce the delay experienced by a wireless user, because the packet queuing delays at the PDSN and at the RNC are removed. Such a flat architecture is referred to as a Base-Station-Router (BSR) type network architecture.

Figure 2:
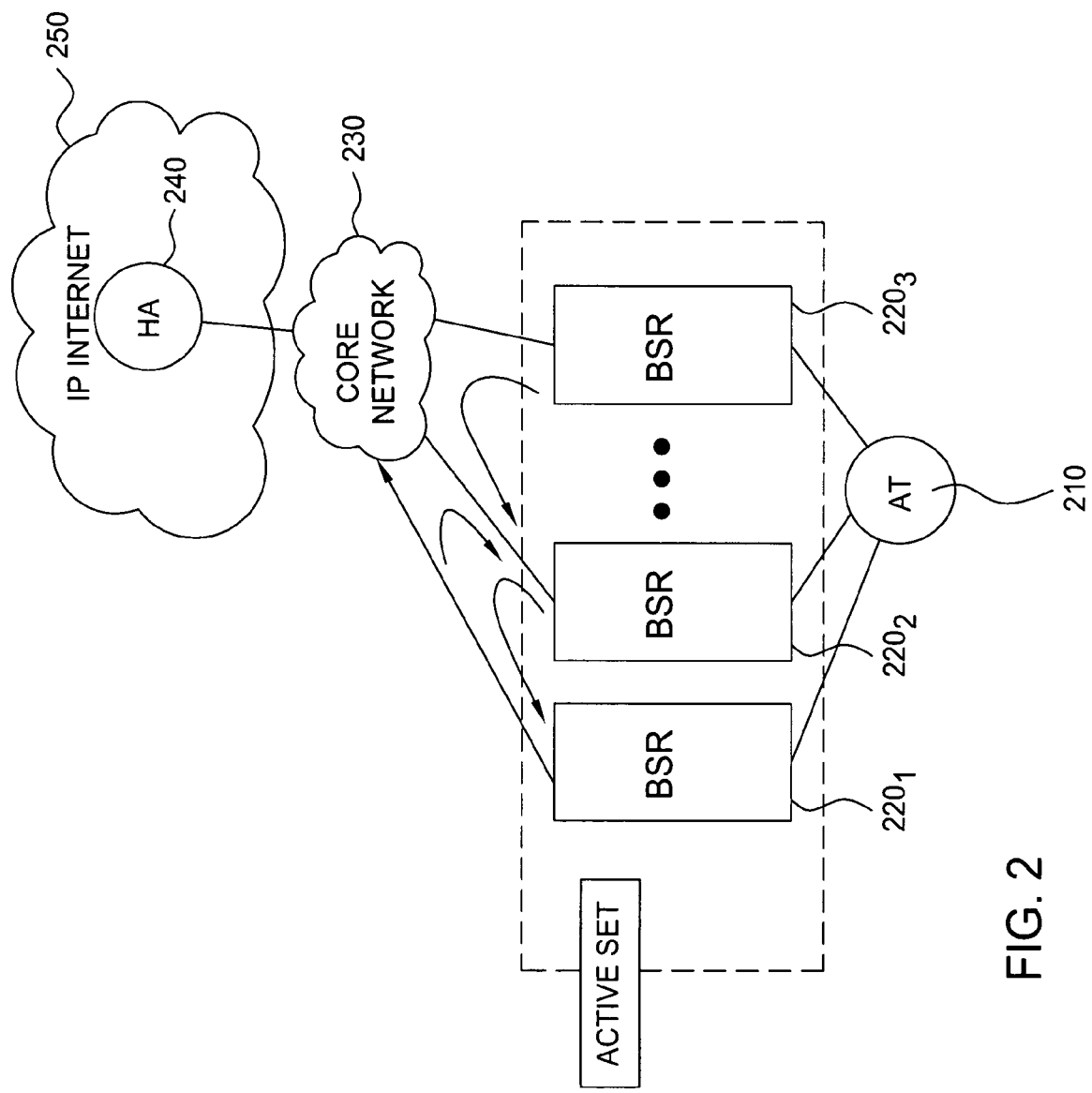
FIG. 2 depicts a high level block diagram of a Base-Station-Router (BSR) type network architecture where an embodiment of the present invention may be applied.

For example, FIG. 2 depicts a high level block diagram of a novel Base-Station-Router (BSR) type network architecture where an embodiment of the present invention may be applied. Such a Base-Station-Router type network architecture is described in commonly assigned U.S. patent application entitled "A wireless communications system employing a network active set formed from base stations operable as primary and secondary agents", which is herein incorporated by reference in its entirety. The BSR network 200 of FIG. 2 illustratively comprises an access terminal (AT) 210 (also referred to as a mobile herein), a plurality of base station routers (BSRs) (illustratively 3 BSRs) $220_1$-$220_3$, a core network 230, a home agent (HA) 240 and an IP Internet 250. In the BSR network 200 of FIG. 2, unlike in conventional IP networks, radio network control functions such as call admission control, CDMA code tree management, and paging control are contained within each of the base station routers $220_1$-$220_3$. More specifically, different ones of the base station routers $220_1$-$220_3$ are able to serve as the primary agent (PA) for different mobiles, unlike in conventional IP network architectures where a single radio network controller (RNC) performs the resource management for all of the mobiles of the set of base stations it controls. In the BSR network 200 of FIG. 2, the core network 230 functions to ensure the efficient and timely delivery of data packets between the BSRs $220_1$-$220_3$. The core network 230 also operates to communicate the reverse link data from the BSRs $220_1$-$220_3$ intended for the HA 240 to the IP Internet 250, which forwards the data to the HA 240. In the forward link direction, the core network 230 functions to communicate data received from the HA 240 through the IP Internet 250 intended for the mobile 210 to the BSRs $220_1$-$220_3$.

In the BSR network 200 of FIG. 2, mobile 210 is in communication with the three BSRs $220_1$-$220_3$ which comprise a network active set (NAS) of the mobile 210. Based on changing radio conditions, mobile 210 may choose to receive data from any of the BSRs within its NAS. Switching may occur on a fast time scale. Within the NAS, one of the BSRs $220_1$-$220_3$ functions as a primary agent (PA) while the other BSRs may function as secondary agents (SA). The PA serves as the anchor for mobility and radio resource management and performs function similar to the RNC in traditional hierarchical network architectures. Although the novel BSR network architecture described above greatly reduces the number of components required in an IP network and thus greatly reduces the costs associated with an IP network, in such BSR network architectures there exist more handoffs between base station routers due to the movement of an access terminal through the network and, as such, a need exists for an efficient, active session mobility solution for RLP. That is, in a BSR architecture, each BSR serves as a base station, RNC, and PDSN. When an AT moves across BSR nodes, it effectively moves across RNCs. Thus AT call states are able to be moved in an active state. A staged state movement approach may be chosen to enable a seamless handoff to the new BSR and an inter-BSR interface will be used to tunnel, control and traffic information between BSRs during mobility.

As in conventional CDMA systems, in the BSR network 200 of FIG. 2, a mobile that powers up in the vicinity of the active set of BSRs $220_1$-$220_3$ acquires a pilot signal from each of the BSRs $220_1$-$220_3$ and uses the access channel to communicate with the base station from which it received the strongest signal to initiate a session. As previously mentioned, the selected BSR having the strongest signal (initially and illustratively BSR $220_1$) serves as a primary agent (PA) and, as such, an access point for the mobile 210. In the BSR network 200 of FIG. 2, the BSR $220_1$ is considered the source BSR and initially terminates the wireless base-station MAC protocol normally maintained in a base station of a traditional hierarchical network architecture, the RLP protocol normally maintained in a RNC of a traditional hierarchical network architecture, as well as the (point-to-point) PPP protocol normally maintained in a packet serving data node (PDSN) of a traditional hierarchical network architecture.

Figure 3:
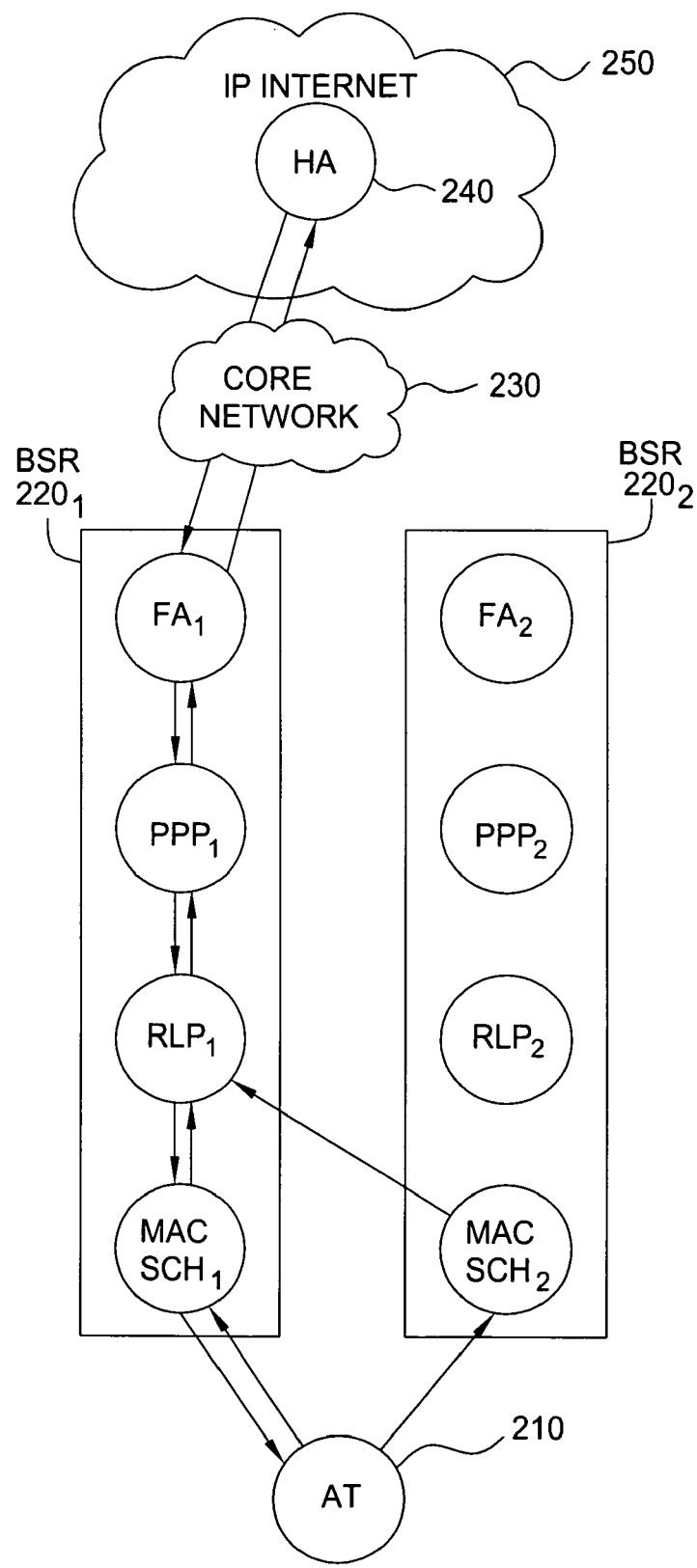
FIG. 3 depicts a high level functional diagram of the BSR network of FIG. 1 during an initial state in which a first BSR is functioning as a Source BSR for a mobile.

FIG. 3 depicts a high level functional diagram of the BSR network 200 of FIG. 2 during an initial state in which the BSR $220_1$ is functioning as the PA (Source BSR) for the mobile 210. BSR $220_1$ of FIG. 3 illustratively comprises a MAC/Scheduler functional block (MAC/SCH$_1$), an RLP functional block (RLP$_1$), a PPP functional block (PPP$_1$), and an FA functional block (FA$_1$). Similarly, the BSR $220_2$ of FIG. 3 illustratively comprises a MAC/Scheduler functional block (MAC/SCH$_2$), an RLP functional block (RLP$_2$), a PPP functional block (PPP$_2$), and an FA functional block (FA$_2$).

In accordance with various embodiments of the present invention, a reliable protocol, such as RLP, is decoupled into a forward-link RLP (F-RLP) component and a reverse-link RLP (R-RLP) component. In the embodiments of the present invention described herein, F-RLP is considered the direction of data flow from the HA 240 to the mobile 210 and R-RLP is considered the direction of data flow from the mobile 210 to the HA 240. In at least the embodiment of the seamless active session mobility solution for RLP of FIG. 3, a component of the BSR migration strategy is to keep F-RLP and the MAC/Scheduler co-located in a serving BSR (initially Source BSR 220$_1$) to take advantage of scheduling efficiencies, avoid time-consuming Mobile IP registrations with excessive movement of the FA and as such the PPP endpoint, and keep interruption of dataflow to a minimum, all while keeping usage of the backhaul through tunnelling at a low level.

That is, initially, all processing of forward and reverse-link data is co-located on the BSR 220$_1$. To avoid time-consuming Mobile IP registrations with the Home Agent, BSR movement is realized by moving individual BSR components of the RLP (e.g., the F-RLP and the R-RLP) in different stages. As a component of the RLP is migrated to a target BSR, processing splits between multiple BSRs, and tunnelling of data must be performed. Since mobility is an expected condition, tunnelling has to be done as components migrate to the new BSR. To minimize excessive backhaul usage, tunnelling must be kept to a minimum.

With respect to the R-RLP, the location of the Frame Selector does not affect the backhaul usage. No matter on which BSR it resides, all of the other BSRs within the active set must tunnel their reverse-link frames to the BSR with the Frame Selector (initially Source BSR 220$_1$). To maintain scheduling efficiencies in the F-RLP direction, keeping the RLP co-located with the MAC/Scheduler will yield the most benefits. When the mobile 210 selects a new serving BSR (i.e., BSR 220$_2$), the mobile 210 will be served data through the new BSR's MAC/Scheduler (i.e., MAC/SCH$_2$). If the Frame Selector and the F-RLP move together to the BSR 220$_2$, there will be a tunnel required to send R-RLP data back to the BSR's 220$_1$ PPP and FA. This data-flow is in addition to the F-RLP data-flow (tunnelled from PPP to RLP) and the R-RLP data-flow (tunnelled from the MAC to the Frame Selector). As such, this is not the preferred method. With the forward link and reverse-link RLP components moving separately, movement of the F-RLP, expected to happen often, follows the mobile 210 to the new BSR along with the serving MAC/Scheduler. This allows for scheduling efficiencies to be achieved by co-locating the F-RLP and the MAC/Scheduler. The R-RLP moves less often along with PPP and FA, therefore, reducing costly Mobile-IP registrations and PPP renegotiations.

Figure 4:
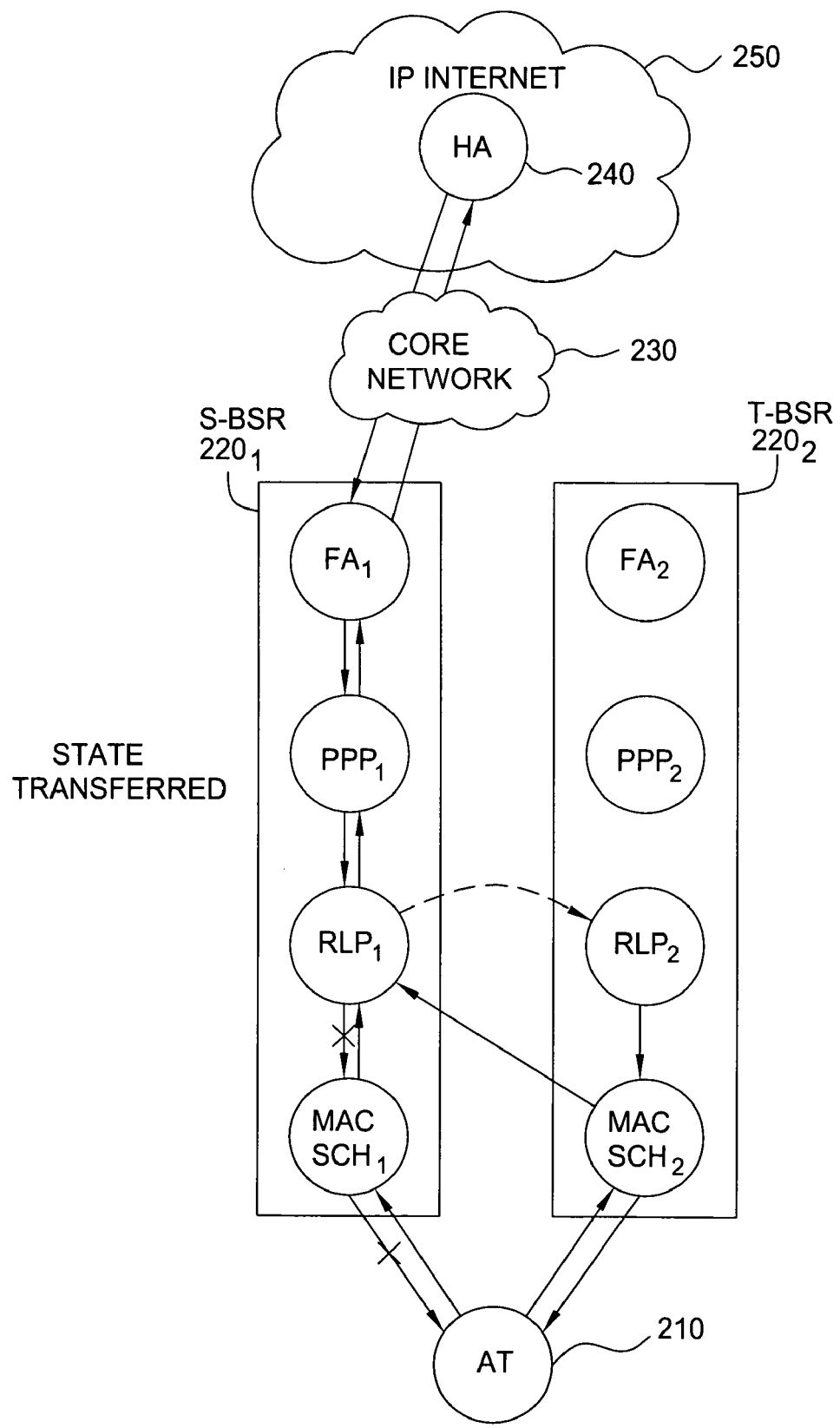
FIG. 4 depicts a high level functional diagram of the BSR network of FIG. 1 during a state when the mobile begins to receive a stronger signal from a second BSR (Target BSR) and chooses to receive its data from the Target BSR.

For example, FIG. 4 depicts a high level functional diagram of the BSR network 200 of FIG. 2 during a state when the mobile 210 begins to receive a stronger signal from the BSR 220$_2$ than from the BSR 220$_1$ (Source BSR) and chooses to receive its data from the BSR 220$_2$ (Target BSR). That is, FIG. 4 depicts the BSRs 220$_1$-220$_2$ during a handoff from the BSR 220$_1$ to the BSR 220$_2$. In the embodiment of the present invention of FIG. 4, the F-RLP is moved to the new serving BSR 220$_2$ as soon as the new BSR 220$_2$ becomes the serving BSR (i.e. a handoff notification such as the data rate control channel (DRC) points to it). This is in keeping with the goal of not denying the MAC layer data upon request from the mobile 210.

The RLP migration in accordance with an embodiment of the present invention begins with migrating the F-RLP. Initially the F-RLP exists on the Source BSR 220$_1$ prior to migration. The Source BSR 220$_1$ is handling all forward-link traffic tasks such as new data octets arriving from the PPP (PPP$_1$), negative acknowledgment messages (NAKs) processed for missing octets in the data, and RLP frames being sent to the MAC/Scheduler (MAC/SCH$_1$) for transmission over-the-air to the mobile 210. The first indication that a handoff will occur between the source BSR 220$_1$ and the target BSR 220$_2$ is the receipt of a notification from the mobile indicating a handoff request through signals such as the data source control channel (DSC) or DRC. Upon receipt of the DSC, the source BSR 220$_1$ and the Target BSR 220$_2$ become aware of the mobile's 210 desire to be served by the Target BSR 220$_2$.

In one embodiment of the present invention taking advantage of early handoff notification (i.e., which may be in the form of a DSC indicator), the source BSR 220$_1$ and the Target BSR 220$_2$ prepare for movement of the F-RLP by duplicating any incoming octets to the Source F-RLP (RLP$_1$) and tunnelling the duplicated octets to the Target RLP (RLP$_2$) along with the starting sequence number of the first packet in the tunnel to be stored in a buffer of the Target BSR 220$_2$. The Source F-RLP (RLP$_1$) also transmits a copy of its buffered octets to the Target RLP (RLP$_2$) such that when the F-RLP is transferred to the Target RLP (RLP$_2$), the Target RLP (RLP$_2$) is able to transmit the data to the mobile 210 without losing any octets and without transmitting the octets out of sequence. The Target RLP (RLP$_2$) is considered to be in the Pre-Serving stage of migration. Furthermore, in various embodiments of the present invention, along with the tunnelling of a copy of the duplicated octets, a starting sequence number, and a copy of the buffered octets to the Target RLP (RLP$_2$), the Source F-RLP (RLP$_1$) also informs the Target RLP (RLP$_2$) in parallel of the RLP state transfer so as to prevent stalling of information flow to the mobile 210.

The terms "data sequence number" and "sequence number" as used throughout this disclosure will now be defined by the inventors before continuing with the description of the various embodiments of the invention. More specifically, when data is tunneled between a source and a target, the data may be tunneled over either a proprietary tunnel or a standard tunneling mechanism. The tunneling mechanism that is used provides the sequencing by providing for a sequence number in the encapsulating header. Because various embodiments of the present invention described herein implement a tunneling mechanism to forward data from a source to a target and from a target to a source, is should herein be assumed that the tunneling mechanism provides sequencing numbers for the transferred data. As such, it should be noted that throughout the description of the invention when the inventors refer to a data sequence number or just a sequence number, the inventors are referring to the sequence numbers given to data by the tunneling mechanisms implemented by the various embodiments of the present invention.

Subsequent to the transmission of the early handoff notification (e.g., DSC), a handoff notification (i.e., such as a data rate control channel (DRC)) is communicated to all of the BSR's within an active set. The DRC indicates that the new serving BSR is the Target BSR 220$_2$. Alternatively, instead of a DRC indication being communicated to all of the BSRs, the indication that the new serving BSR is the Target BSR 220$_2$ may be affected by the termination of the early handoff notification (e.g., the DSC). As such, the DRC or alternatively the termination of the early notification (e.g., the DSC) indicates that the new serving BSR is the Target BSR 220$_2$. Upon the Target BSR 220$_2$ becoming the serving BSR, the Source BSR 220$_1$ transmits a last byte sequence number, V(S$_L$), to the Target BSR 220$_2$. The last byte sequence number, V(S$_L$), indicates the last octet segmented by the Source BSR $220_1$. The F-RLP processing (segmenting of data) begins at the Target BSR $220_2$ with the occurrence of the octet after the octet having the last byte sequence number, $V(S_L)$. Alternatively and because the Target BSR $220_2$ receives a copy and is informed of the status of all of the octets received by and maintained in a buffer of the Source BSR $220_1$, F-RLP processing may begin in the Target BSR $220_2$ immediately upon receipt of the handoff notification or the expiration of the early handoff notification.

In addition to the forwarding of the copy of the octets, the RLP ($RLP_1$) of the Source BSR forwards any buffered NAKs to the RLP ($RLP_2$) of the Target BSR $220_2$. As such, any NAKs generated for the retransmission of a lost octet may be serviced by the Target BSR $220_2$. Therefore, the Source RLP ($RLP_1$) becomes non-serving and the mobile 210 is served forward-link data from the Target RLP ($RLP_2$). As such, now in the forward-link direction, the HA 240 sends forward-link data to the FA ($FA_1$) of the Source BSR $220_1$. The Source FA ($FA_1$) then sends the forward-link data to the PPP ($PPP_1$) of the Source BSR $220_1$ which tunnels the forward-link data to the PPP ($PPP_2$) of the Target BSR $220_2$. The Target PPP ($PPP_2$) then communicates the forward-link data to the RLP (F-RLP) of the Target BSR $220_2$ which sends the forward-link data to the MAC Scheduler ($MAC/SCH_2$) of the Target BSR $220_2$ which ultimately communicates the forward-link data to the mobile 210 over the air.

In an embodiment of the present invention having no early notification, the RLP ($RLP_1$) of the Source BSR $220_1$ begins tunnelling segmented data to the RLP ($RLP_2$) of the Target BSR $220_2$ with the receipt of the DRC indicating a handover to the target. In addition, the Source BSR $220_1$ records a sequence number, V(S), of an octet being segmented when the DRC was received. The Source BSR $220_1$ determines a future sequence number, V(S+x), and transmits both sequence numbers to the Target BSR $220_2$ indicating the intention to complete the migration of the F-RLP before the receipt of an octet having the future sequence number, V(S+x). The Target BSR $220_2$ receives both sequence numbers and updates the sequence number as data arrives. If an acknowledgement is not received from the Target BSR $220_2$ accepting the assignment before the occurrence of the future sequence number V(S+x), segmenting of the data continues in the RLP ($RLP_1$) of the Source BSR and the segmented octets are forwarded from the RLP ($RLP_1$) of the Source BSR $220_1$ to the RLP ($RLP_2$) of the Target BSR $220_2$. The Source BSR $220_1$ then selects a second future sequence number, V(S+nx), and forwards the second future sequence number V(S+nx) to the Target BSR $220_2$. This process continues until the Target BSR $220_2$ transmits an acknowledgment to the Source BSR $220_1$ accepting the assignment before a sequence number determined by the Source BSR $220_1$. That is, upon acknowledgment by the Target BSR $220_2$, octets having a sequence number less than or equal to, for example in a first iteration, V(S+x) are continued to be segmented in the Source BSR $220_1$ and forwarded to the Target BSR $220_2$, however non-segmented octets (i.e., PPP octets) having a sequence number greater than V(S+x) (e.g., V(S+x+1)) are tunnelled from the PPP ($PPP_1$) of the Source BSR $220_1$ to the PPP ($PPP_2$) of the Target BSR $220_2$ to be segmented by the RLP ($RLP_2$) of the Target BSR $220_2$. The segmented octets are then communicated by the Target BSR $220_2$ to the mobile 210.

In this embodiment, because the Target F-RLP ($RLP_2$) of the Target BSR $220_2$ is servicing new octets, it will be handling NAKs for octets with sequence numbers greater than the sequence number V(S+x) communicated from the Source BSR $220_1$. The mobile 210 and thus the R-RLP is aware of the state of the F-RLP migration and forwards any NAKs to either the Source F-RLP ($RLP_1$) or the Target F-RLP ($RLP_2$) depending on where the missing octet is stored, which may be determined by the sequence number of the missing octet. The Source RLP ($RLP_1$) is now considered to be in the Post-Serving stage of migration and maintains a buffer of any octets having a sequence number less than or equal to V(S+x) for which NAKs may be received. Optionally, the F-RLP ($RLP_1$) of the Source BSR $220_1$ may include a timer to establish an amount of time for the F-RLP ($RLP_1$) of the Source BSR $220_1$ to wait for NAKs after which the F-RLP instance of the Source BSR $220_1$ is deleted.

Figure 5:
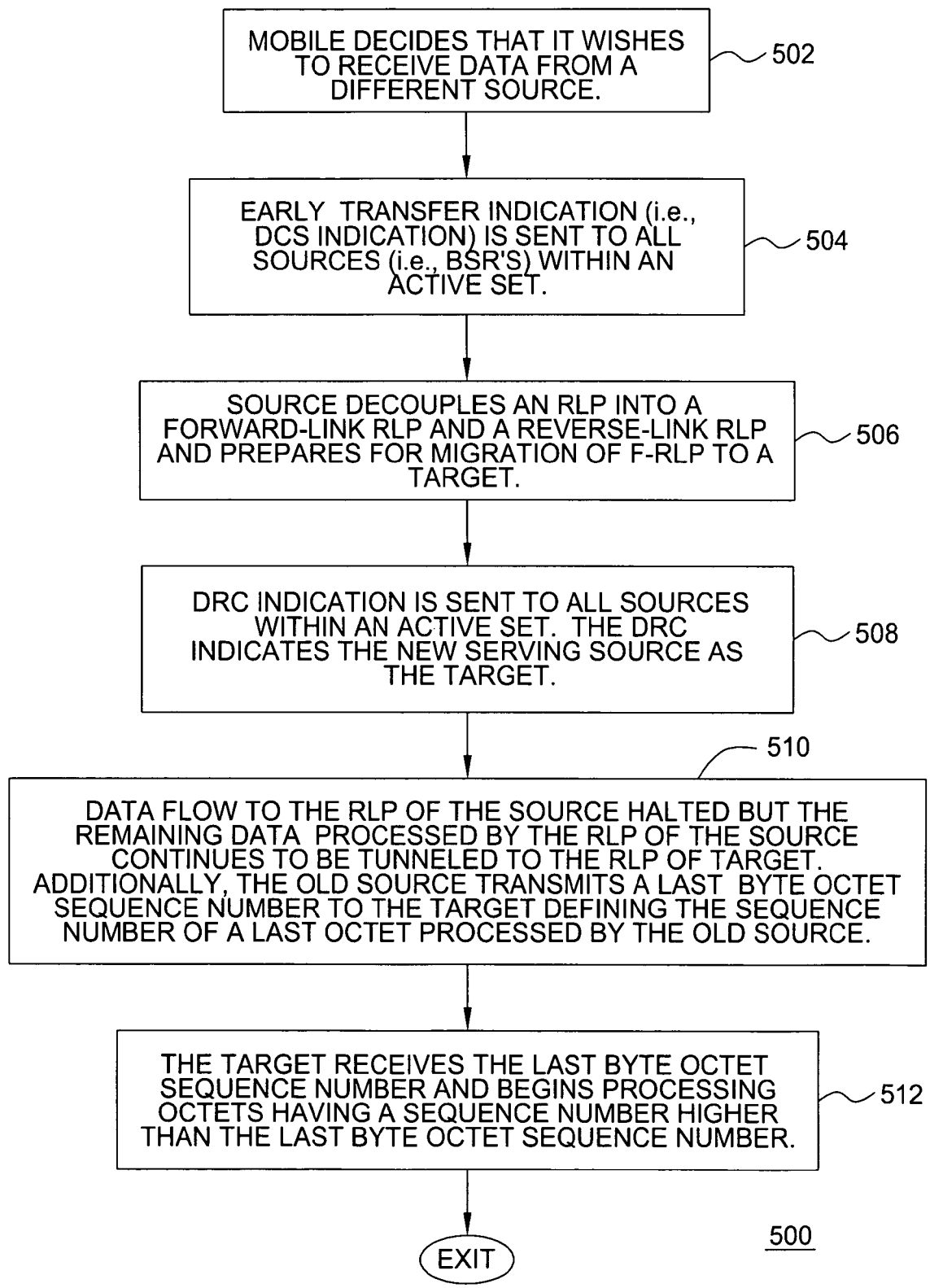
FIG. 5 depicts a high level block diagram of a method for active session mobility for forward-link radio link protocol (F-RLP) in accordance with an embodiment of the present invention.

FIG. 5 depicts a high level block diagram of a method for active session mobility for F-RLP in accordance with an embodiment of the present invention. The method 500 begins at step 502, where a mobile decides that it wishes to receive data from a different source (i.e., Target BSR). The method 500 then proceeds to step 504.

At step 504, an early transfer notification (i.e., DSC indication) is sent to all sources (i.e., BSR's) within an active set. The method 500 then proceeds to step 506.

At step 506, a serving source (illustratively BSR $220_1$ in FIG. 4) decouples an RLP into a forward-link RLP (F-RLP) and a reverse-link RLP (R-RLP) and prepares for the migration of F-RLP to a target. More specifically, at step 506, the RLP of the source begins to tunnel a duplicate copy of forward-link data and of its buffer to the RLP of the target. The data, however, is not processed at this time by the RLP of the target. The method 500 then proceeds to step 508.

At step 508, a handoff notification (e.g., a DRC) is sent to all sources (i.e., BSR's) within an active set. The DRC defines the target as the new serving source (illustratively BSR $220_2$ in FIG. 4). The method 500 then proceeds to step 510.

At step 510, data flow to the RLP of the source halted but the remaining data processed by the RLP of the source continues to be tunnelled to the RLP of target. Additionally, the old source transmits a last byte octet sequence number to the target defining the sequence number of a last octet processed by the old source. The source however maintains a re-transmit buffer to handle NAKs for bytes with a sequence number less than or equal to the last byte octet sequence number. The method then proceeds to step 512.

In an alternate embodiment of the present invention, at step 510, the contents of the re-transmit buffer of the old source, if any, waiting for a NAK or for time-out, may be forwarded to the target in parallel to the tunnelling of the remaining data processed by the RLP of the old source. In this case the old source simply forwards received NAKs to the Target, which then initiates the retransmission. The method 500 then proceeds to step 512.

At step 512, the target receives the last byte octet sequence number and begins processing octets having a sequence number higher than the last byte octet sequence number. The method 500 is then exited.

Figure 6:
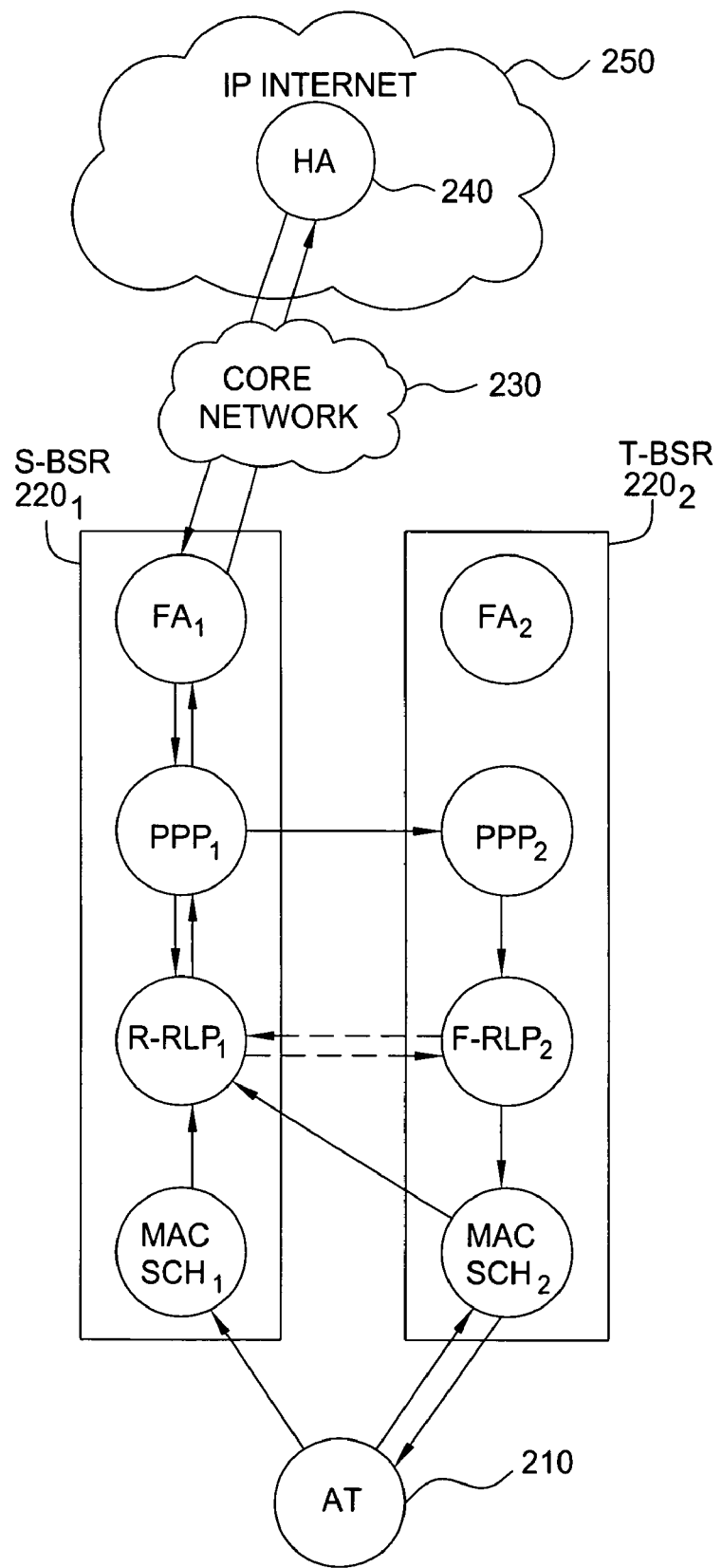
FIG. 6 depicts a high level functional diagram of the BSR network of FIG. 1 after transfer of the F-RLP from the Source BSR to the Target BSR.

FIG. 6 depicts a high level functional diagram of the BSR network 200 of FIG. 2 after transfer of the F-RLP from the Source BSR $220_1$ to the Target BSR $220_2$ (e.g., after the method 500 is complete). As depicted in FIG. 6, in the forward-link direction, the HA 240 sends forward-link data to the FA ($FA_1$) of the Source BSR $220_1$. The Source FA ($FA_1$) then sends the forward-link data to the PPP ($PPP_1$) of the Source BSR $220_1$ which tunnels the forward-link data to the PPP ($PPP_2$) of the Target BSR $220_2$. The Target PPP ($PPP_2$) then communicates the forward-link data to the RLP (F-RLP) of the Target BSR $220_2$ which sends the forward-link data to the MAC Scheduler (MAC/SCH$_2$) of the Target BSR 220$_2$ which ultimately communicates the forward-link data to the mobile 210 over the air.

In the reverse-link direction, the mobile 210 broadcasts reverse-link data to all of the BSRs in the active set (illustratively BSRs 220$_1$-220$_2$ in FIG. 6). Each of the Mac Schedulers (MAC/SCH$_1$-MAC/SCH$_2$) of the BSRs 220$_1$-220$_2$ communicates the received data to the RLP (illustratively R-RLP) of the serving BSR (illustratively Source BSR 220$_1$) performing the Frame Selection. The Target Mac Scheduler (MAC/SCH$_2$) also communicates correct reverse-link Mac Frames to the RLP (F-RLP) of the Target BSR 220$_2$. Such an implementation reduces the retransmission time in case any NAK is sent by the mobile since the Target F-RLP need not wait for NAKs to be forwarded from the Source. As such, the frame selector is being by-passed since the Target has already received the correct reverse-link frame. The RLP (R-RLP) of the Source BSR 220$_1$ communicates the received data to the PPP (PPP$_1$) of the Source BSR 220$_1$, which communicates the data to the FA (FA$_1$) of the Source BSR 220$_1$, which communicates the data to the intranet 230 and on up to the HA 240. As depicted in FIG. 6, it should be noted that a communication path exists between the RLP (R-RLP) of the Source BSR 220$_1$ and the RLP (F-RLP) of the Target BSR 220$_2$ for transferring information and data such as NAKs and missing octets, and segmented data before an acknowledgment is received.

After the F-RLP migrates from the Source BSR 220$_1$ to the Target BSR 220$_2$, the R-RLP may also be transferred from the Source BSR 220$_1$ to the Target BSR 220$_2$. Prior to the migration of the R-RLP to the Target BSR 220$_2$, the R-RLP at the Source BSR 220$_1$ is operating in the Serving Stage. That is, reverse-link octets from the mobile 210 are received at each BSR 220$_1$-220$_2$ within the active set however, frame selection continues to take place at the Source BSR 220$_1$. After the frame selection is completed, NAKs are forwarded to the appropriate serving F-RLP as described above and data is sent to the serving reverse PPP (PPP$_1$) in the Source BSR 220$_1$.

When a decision is made to transfer the R-RLP from the Source BSR 220$_1$ to the Target BSR 220$_2$, the Source BSR 220$_1$ informs the Target BSR 220$_2$ of the next expected reverse sequence number V(R) to be received by the Target BSR 220$_2$. The Source BSR 220$_1$ also informs all other BSRs in the active set that Frame Selection is now taking place in the Target BSR 220$_2$. That is, in this embodiment of the present invention, when the R-RLP is moved the Frame Selection is moved to a Target BSR, substantially simultaneously.

At the instance that the R-RLP in the Source BSR 220$_1$ becomes non-serving, at sequence number V(R), the Source BSR 220$_1$ enters the Post-Serving Stage, where it maintains its re-sequencing buffer and continues to receive any octets with sequence numbers prior to V(R). Any newer octets (octets with sequence numbers greater than V(R)) are directed toward the R-RLP of the Target BSR 220$_2$ which maintains its own re-sequencing buffer. It should be noted, however, that no delivery of octets toward the HA 240 shall occur from the Target BSR 220$_2$ until the Target BSR 220$_2$ receives an indication from the R-RLP of the Source BSR 220$_1$ that all of its octets have either been delivered or have timed out waiting for receipt.

The R-RLP of the Target BSR 220$_2$ maintains awareness of the last sequence number, V(R-1), maintained in the R-RLP of the re-sequencing buffer of the Source BSR 220$_1$ such that any "old" octets (octets with a sequence number less than V(R)) may be forwarded by the R-RLP of the Target BSR 220$_2$ to the R-RLP of the Source BSR 220$_1$. Each R-RLP shall maintain its respective re-sequencing buffer and update sequence numbers signifying the next octet for delivery to the network. The R-RLP of the Target BSR also maintains awareness of the F-RLP status and forwards NAKs according to F-RLP requirements discussed previously. In addition, when the octet having the sequence number V(R-1) is communicated to the PPP (PPP$_1$) of the Source BSR 220$_1$, the Source BSR 220$_1$ notifies the Target BSR 220$_2$ and the PPP (PPP$_1$) of the Source BSR 220$_1$ now expects the uplink data source to be the Target BSR 220$_2$ from the sequence number V(R) and higher.

Figure 7:
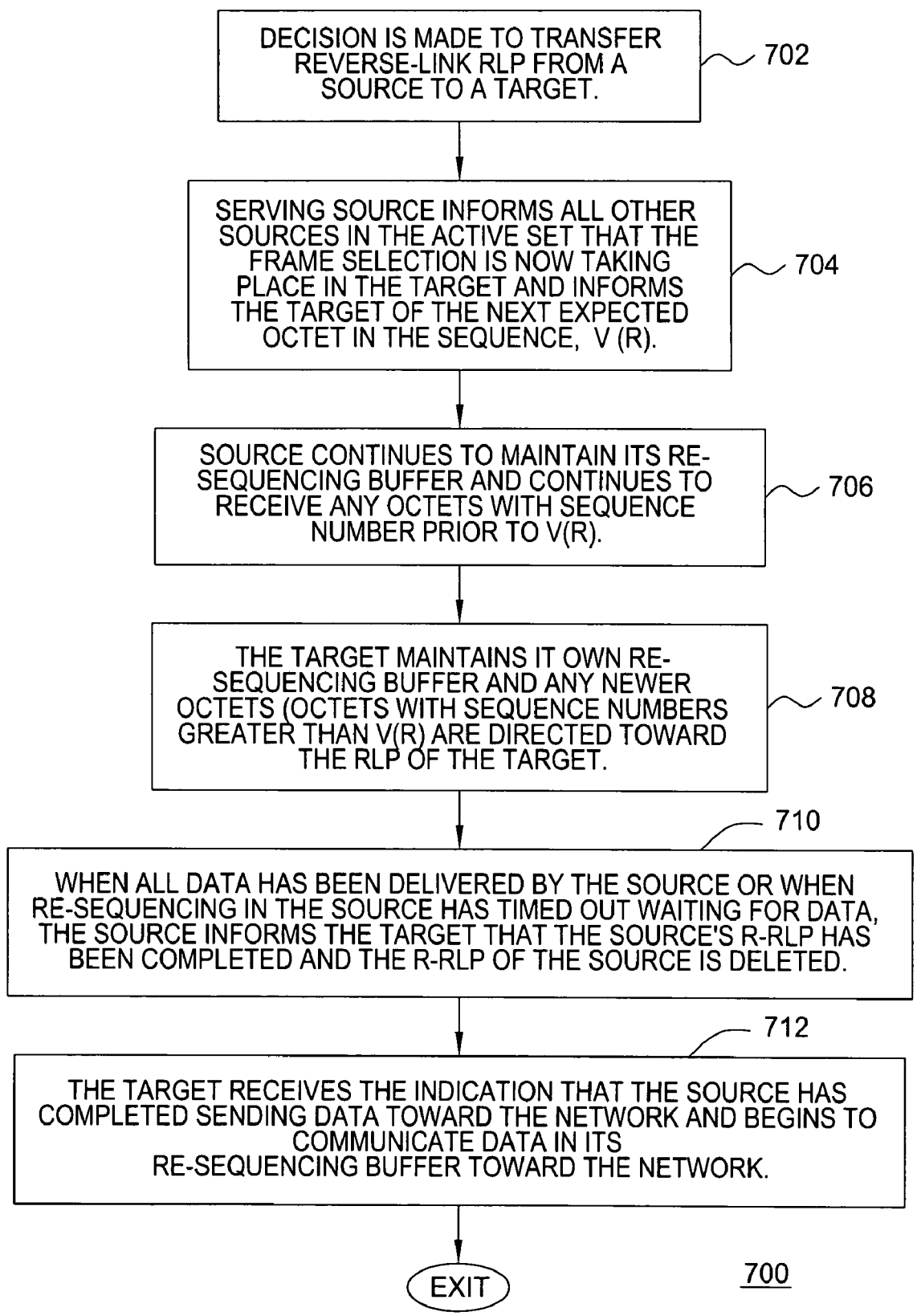
FIG. 7 depicts a high level block diagram of a method for active session mobility for R-RLP in accordance with an embodiment of the present invention.

FIG. 7 depicts a high level block diagram of a method for active session mobility for R-RLP in accordance with an embodiment of the present invention. The method 700 begins at step 702, when a decision is made to transfer the R-RLP from a Source to a Target. The method 700 then proceeds to step 704.

At step 704, the source informs all other sources (i.e., BSRs) in the active set that the Frame Selection is now taking place in the target and informs the target of the next expected octet in the sequence V(R). The method 700 then proceeds to step 706.

At step 706, the source (i.e., Source BSR 220$_1$) continues to maintain its re-sequencing buffer and continues to receive any octets with sequence numbers prior to V(R). The method 700 then proceeds to step 708.

At step 708, the target (i.e., BSR 220$_2$) maintains its own re-sequencing buffer and any newer octets (octets with sequence numbers greater than V(R)) are directed toward the RLP of the target. The method 700 then proceeds to step 710.

At step 710, when all data has been delivered by the source or when re-sequencing in the source has timed out waiting for data, the source informs the target that the source's R-RLP has been completed and the R-RLP of the source is deleted. That is for example, no delivery of octets toward the network shall occur from the Target BSR 220$_2$ until the Target BSR 220$_2$ receives an indication from the R-RLP of the Source BSR 220$_1$ that all of its octets have either been delivered or have timed out waiting for receipt. The method 700 then proceeds to step 712.

At step 712, the target receives the indication that the source has completed sending data toward the network and begins to communicate data in its re-sequencing buffer toward the network. The method 700 is then exited.

Figure 8:
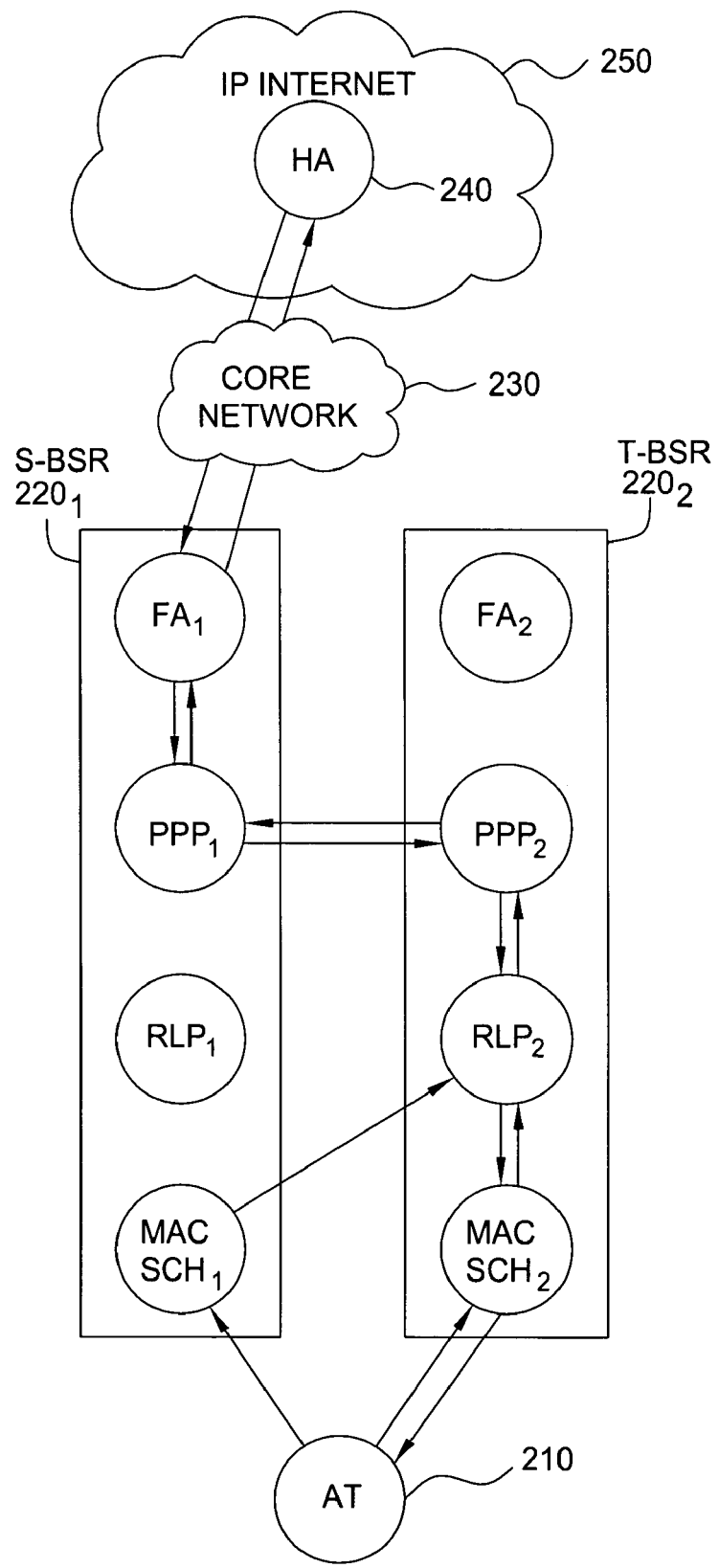
FIG. 8 depicts a high level functional diagram of the BSR network of FIG. 1 after the transfer of the F-RLP and R-RLP from the Source BSR to the Target BSR.

FIG. 8 depicts a high level functional diagram of the BSR network 200 of FIG. 2 after the transfer of the F-RLP and R-RLP from the Source BSR 220$_1$ to the Target BSR 220$_2$. As depicted in FIG. 8, in the reverse-link direction, R-RLP data from the mobile 210 is broadcast to all of the BSRs 220$_1$-220$_3$ in the active set. Each of the Mac Schedulers (MAC/SCH$_1$-MAC/SCH$_3$) of the BSRs 220$_1$-220$_3$ communicate the received data to the RLP (illustratively RLP$_3$) of the serving BSR (illustratively BSR 220$_2$) which performs the Frame Selection. The RLP (RLP$_3$) of the Target BSR 220$_2$ communicates the received data to the PPP (PPP$_2$) of the Target BSR 220$_2$, which tunnels the data to the PPP (PPP$_1$) of the Source BSR 220$_1$. The PPP (PPP$_1$) of the Source BSR 220$_1$ communicates the data to the FA (FA$_1$) of the Source BSR 220$_1$, which communicates the data to the intranet 230 and on up to the HA 240.

In the forward-link direction, the data flow is substantially reversed. More specifically, data from the HA 240 is communicated to the FA (FA$_1$) of the Source BSR 220$_1$. The FA (FA$_1$) communicates the data to the PPP$_1$, which tunnels the data to the PPP (PPP$_2$) of the Target BSR 220$_2$. The PPP (PPP$_2$) of the Target BSR 220$_2$ communicates the data to the RLP (RLP$_2$) of the Target BSR 220$_2$, which communicates the data to the Mac Scheduler (MAC/SCH$_2$) of the Target BSR $220_2$, which communicates the data over the air to the mobile 210.

It should be noted that although various embodiments of an active session RLP mobility solution in accordance with the present invention are described above as having two RLP migration states that are migrated implementing a two-stage RLP transfer process for the migration of the two defined states from a source to a target, alternate embodiments of the present invention may comprise migrating the two RLP migration states, F-RLP and R-RLP, in a single stage implementing at least the methods for migration described above.

As previously mentioned, in networks implementing embodiments of an RLP mobility solution in accordance with the present invention, a mobile may require a plurality of handoffs in a relatively short period of time. As such, various embodiments of RLP mobility solutions of the present invention may optionally include a timer for deciding when to transfer the R-RLP from a source to a target, for example, a Source BSR to a Target BSR. More specifically, after the transfer of the F-RLP from a Source BSR to a Target BSR, the Source BSR may initiate a timer that must expire before the R-RLP in the Source BSR may be transferred to a Target BSR. That is, when a mobile decides that it would like to receive data from a Target BSR (i.e. because the mobile is receiving a stronger signal from the Target BSR) the F-RLP in the Source BSR is transferred to the Target BSR. However, shortly after the transfer of the F-RLP from the Source BSR to the Target BSR, the mobile may thereafter revert back to receiving a stronger signal from the original Source BSR or encounter a subsequent BSR from which it is receiving a stronger signal. As such, in embodiments of RLP mobility solutions implementing a timer for controlling the transfer of R-RLP, the R-RLP may be maintained in the Source BSR for a period of time long enough for the mobile to regain a stronger signal from the Source BSR or to attain a stronger signal from a subsequent, second Target BSR. In the former case, the R-RLP would remain in the Source BSR and the F-RLP may revert back to the Source BSR. In the latter case, the F-RLP would transfer from the Target BSR to the subsequent, second Target BSR and, if the timer expires, the R-RLP would be transferred from the Source BSR directly to the subsequent, second Target BSR, therefore eliminating the need to transfer the R-RLP to the first Target BSR. As such, the optional timer implemented in the various embodiments of RLP mobility solutions in accordance with the present invention may function to reduce the number of times that the R-RLP needs to be transferred.

Similarly, a timer may be optionally implemented to control when the F-RLP is transferred from a source to a target, for example from a Source BSR to a Target BSR. More specifically and as described above, a mobile may move between several data sources of an active set in a short period of time and may even move back and forth between various active sets. As such, a mobile may decide that it would like to receive data from a target (i.e. because the mobile is receiving a stronger signal from the target than from the source). Shortly thereafter, the mobile may revert back to receiving a stronger signal from the original source or encounter a subsequent target from which it is receiving a stronger signal. As such, in embodiments of RLP mobility solutions implementing a timer for controlling the transfer of F-RLP, the F-RLP may be maintained in the Source BSR for a period of time long enough for the mobile to regain a stronger signal from the source or to attain a stronger signal from a subsequent, second target. In the former case, the F-RLP would remain in the source until the timer expires during which time the mobile may decide to again receive data from the source. In the latter case, the F-RLP would again remain in the source until the expiration of the timer and only after the expiration of the timer would the F-RLP be transferred to a target from which the mobile is receiving its strongest signal. As such, the optional timer implemented in the various embodiments of RLP mobility solutions in accordance with the present invention may function to reduce the number of times that the F-RLP needs to be transferred.

As indicated from the disclosure above, F-RLP and R-RLP may be moved from a source to a target and to a subsequent target simultaneously or individually and during varying iterations. More specifically, F-RLP and R-RLP may be transferred as described above from a source to a first target and subsequently to a second target, or alternatively F-RLP may be transferred to a first target then to a second target and subsequently the R-RLP may be transferred either to the first target and then the second target or directly to the second target. That is, in accordance with various embodiments of the present invention, the components of RLP defined herein, namely F-RLP and R-RLP, may be transferred between sources and targets simultaneously, individually or in any combination thereof.

Although various embodiments of an active session RLP migration solution of the present invention have been depicted with respect to a BSR network architecture, it will be appreciated by those skilled in the art and informed by the teachings of the present invention that the concepts of an active session RLP migration solution of the present invention may be applied in substantially any network implementing a reliable protocol such as a radio link protocol (RLP). More specifically and for example, the concepts of an active session RLP migration solution of the present invention may be applied in the conventional CDMA hierarchical wireless IP network 100 of FIG. 1 to actively migrate an RLP session among various RNCs 125 caused by, for example, the mobility of the access terminal 110.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method for seamless active session migration of a reliable protocol session from a source Base-Station-Router (BSR) to a target BSR in a wireless IP network, comprising:

decoupling at said source BSR said reliable protocol session served by said source BSR into a forward-link state and a reverse-link state, wherein said forward-link state comprises forward-link state data of said reliable protocol session and said reverse-link state comprises reverse-link state data of said reliable protocol session; and migrating separately said forward-link state and said reverse-link state from said source BSR to said target BSR, wherein upon completion of the migrating, said target BSR is operable to serve said reliable protocol session, wherein said source BSR and said target BSR are components of a distributed cellular network and said source BSR and said target BSR are adapted to serve as a primary agent and a secondary agent.

2. The method of claim 1, wherein at least said forward-link state is migrated from said source BSR to said target BSR in a first stage of migration and at least said reverse-link state is migrated from said source BSR to said target BSR in a second stage of migration.

3. The method of claim 2, wherein said first stage of migration comprises:
   transmitting, to said source BSR and to said target BSR, a signal indicating an imminent migration of said forward-link state of said reliable protocol session from said source BSR to said target BSR;
   tunneling, upon receipt of said signal by said source BSR, forward-link data segmented by said source BSR and said forward-link state data segmented by said source BSR to said target BSR;
   transmitting from said target BSR to said source BSR an acknowledgment indicating the readiness of said target BSR to receive the migration of said forward-link state of said reliable protocol session from said source BSR; and
   tunneling, upon receipt of said acknowledgment by said source BSR, pre-segmented forward-link data from said source BSR to said target BSR.

4. The method of claim 3, wherein said forward-link state data segmented by said source BSR is tunneled to said target BSR in parallel with said forward-link data segmented by said source BSR so as to prevent stalling of information flow to an access terminal.

5. The method of claim 3, wherein said pre-segmented forward-link data tunneled by said source BSR to said target BSR is segmented by said target BSR and communicated by said target BSR to an access terminal.

6. The method of claim 3, wherein said pre-segmented forward-link data tunneled by said source BSR to said target BSR is tunneled by said target BSR to a second target BSR.

7. The method of claim 6, wherein said second target BSR is a target BSR from which an access terminal is receiving a stronger pilot signal.

8. The method of claim 6, wherein said pre-segmented forward-link data tunneled by said target BSR to said second target BSR is segmented by said second target BSR and communicated by said second target BSR to an access terminal.

9. The method of claim 3, wherein said source BSR further communicates a sequence number to said target BSR, said sequence number defining an octet in a sequence of octets of said forward-link data with which segmenting of forward-link data will commence at said target BSR if said source BSR receives said acknowledgment from said target BSR before the arrival of said octet at said source BSR.

10. The method of claim 2, wherein said first stage of migration comprises:
    transmitting, to said source BSR and to said target BSR, an early indication signal indicating a possible migration of said forward-link state of said reliable protocol session from said source BSR to said target BSR
    tunneling, upon receipt of said early indication signal, a copy of data received by said source BSR to said target BSR;
    transmitting, to said source BSR and to said target BSR, a migration signal indicating an imminent migration of said forward-link state of said reliable protocol session from said source BSR to said target BSR; and
    tunneling, upon receipt of said migration signal, pre-segmented forward-link data from said source BSR to said target BSR.

11. The method of claim 10, wherein when said target BSR receives a copy of the data received by said source BSR, segmenting of said forward-link data commences in said target BSR with the receipt of said migration signal.

12. The method of claim 10, wherein said source BSR, upon receipt of said migration signal, communicates a sequence number to said target BSR, said sequence number defining an octet in a sequence of octets of said forward-link data with which segmenting of forward-link data will commence at said target BSR.

13. The method of claim 2, wherein said second stage of migration comprises:
    communicating, from said source BSR to at least said target BSR, a signal indicating that frame selection will be performed at said target BSR beginning with a next expected reverse-link octet of reverse-link data;
    communicating, from said source BSR to said target BSR, a sequence number of said next expected reverse-link octet of reverse-link data;
    forwarding reverse-link octets of said reverse-link data having sequence numbers less than the sequence number of said next expected reverse-link octet to said source BSR to be segmented by said source BSR and communicated toward a home agent; and
    forwarding reverse-link octets having sequence numbers greater than or equal to the sequence number of said next expected reverse-link octet to said target BSR to be buffered by said target BSR.

14. The method of claim 13, wherein said source BSR informs said target BSR when a reverse-link octet having a sequence number one before the sequence number of said next expected reverse-link octet has been processed by said source BSR and communicated by said source BSR toward said home agent, such that said target BSR may begin processing buffered and newly received octets and communicating said buffered and newly received octets toward said home agent.

15. The method of claim 1, further comprising:
    performing MAC/scheduling functions in said target BSR upon the migration of said forward-link state to said target BSR.

16. The method of claim 1, further comprising:
    performing frame selection in said target BSR upon the migration of said reverse-link state to said target BSR.

17. The method of claim 1, wherein a protocol used in said reliable protocol session comprises a radio link protocol.

18. The method of claim 1, wherein said source BSR and said target BSR comprise packet serving data nodes (PSDN).

19. The method of claim 1, wherein said source BSR and said target BSR comprise radio network controllers (RNCs).

20. The method of claim 1, wherein said forward-link and reverse-link state data comprise data describing processing of data and maintenance of information associated respectively with said forward-link and reverse-link.

21. A method for seamless active session migration of a reliable protocol session from a source Base-Station-Router (BSR) to a target BSR, comprising:
    decoupling at said source BSR said reliable protocol session into a first state and a second state, wherein said first state comprises forward-link state data of said reliable protocol session and said second state comprises reverse-link state data of said reliable protocol session, wherein said source BSR and said target BSR are components of distributed cellular network and said source BSR and said target BSR are adapted to serve as a primary agent and a secondary agent;
    communicating, to said source BSR and to said target BSR, a signal indicating an imminent migration of said first state of said reliable protocol session from said source BSR to said target BSR;
    forwarding, upon receipt of said signal by said source BSR, IP data segmented by said source BSR to said target BSR;

communicating from said target BSR to said source BSR a signal indicating the readiness of said target BSR to receive the migration of said first state of said reliable protocol session from said source BSR; and forwarding, upon receipt of said signal from said target BSR by said source BSR, pre-segmented IP data from said source BSR to said target BSR.

22. The method of claim 21, further comprising:

communicating, from said source BSR to at least said target BSR, a signal indicating that frame selection will be performed at said target BSR beginning with a next expected octet of IP data, triggering the migration of said second state to said target BSR;

communicating, from said source BSR to said target BSR, a sequence number of said next expected octet of IP data;

forwarding octets of said IP data having sequence numbers less than the sequence number of said next expected reverse-link octet to said source BSR; and forwarding octets having sequence numbers greater than or equal to the sequence number of said next expected octet to said target BSR to be buffered by said target BSR.

23. The method of claim 21, wherein at least said first state is migrated from said source BSR to said target BSR in a first stage of migration and said second state is migrated from said source BSR to said target BSR in a second stage of migration, said second stage of migration performed separately from said first stage of migration.

* * * * *